United States Patent [19]

Hirota

[11] Patent Number: 5,657,395
[45] Date of Patent: Aug. 12, 1997

[54] IMAGE PROCESSING DEVICE PROVIDING IMPROVED IMAGE DATA PROCESSING BY CONVERTING ORIGINAL IMAGE INTO A PLURALITY OF PIXELS AND ANALYZING DENSITY DATA OF EACH PIXEL

[75] Inventor: Yoshihiko Hirota, Osaka, Japan

[73] Assignee: Minolta Camera Kabushiki Kaisha, Osaka, Japan

[21] Appl. No.: 370,478

[22] Filed: Jan. 9, 1995

Related U.S. Application Data

[63] Continuation of Ser. No. 139,292, Dec. 15, 1992, abandoned, which is a continuation of Ser. No. 486,860, Mar. 1, 1990, abandoned.

[30] Foreign Application Priority Data

Mar. 2, 1989 [JP] Japan ............... 1-051765

[51] Int. Cl.$^6$ .................. G06K 9/46; G03F 3/08; H04N 9/74
[52] U.S. Cl. .............. 382/163; 382/167; 358/518; 348/586; 348/599
[58] Field of Search ............... 382/163, 167; 358/518, 519, 520, 521; 348/582, 586, 587, 592, 599

[56] References Cited

U.S. PATENT DOCUMENTS

| | | | |
|---|---|---|---|
| 4,388,639 | 6/1983 | Cox et al. | 348/587 |
| 4,409,611 | 10/1983 | Vlahos | 348/587 |
| 4,719,490 | 1/1988 | Yoshida et al. | 355/4 |
| 4,739,397 | 4/1988 | Hayashi | 358/80 |
| 4,763,190 | 8/1988 | Froelich | 358/79 |
| 4,792,847 | 12/1988 | Shimazaki et al. | 358/80 |
| 4,825,298 | 4/1989 | Ikuta et al. | 358/298 |
| 4,975,769 | 12/1990 | Aizu et al. | 358/80 |
| 4,977,448 | 12/1990 | Murata et al. | 358/75 |
| 5,003,616 | 3/1991 | Orita et al. | 382/41 |
| 5,008,742 | 4/1991 | Shigaki et al. | 358/79 |

Primary Examiner—Leo Boudreau
Assistant Examiner—Matthew C. Bella
Attorney, Agent, or Firm—Burns, Doane, Swecker & Mathis, LLP

[57] ABSTRACT

An image processing device in accordance with the present invention processes image data obtained by reading an original image including an image portion and a background portion to subdivide the original image into a plurality of images, the image data including density data representing density of each image. The device includes a device for outputting background density data, a device for outputting density coefficient data, a background color removing device for decreasing a value of density data corresponding to the background portion based on the background density data, and a density correcting device for increasing a value of density data corresponding to the image portion based on the density coefficient data.

9 Claims, 11 Drawing Sheets

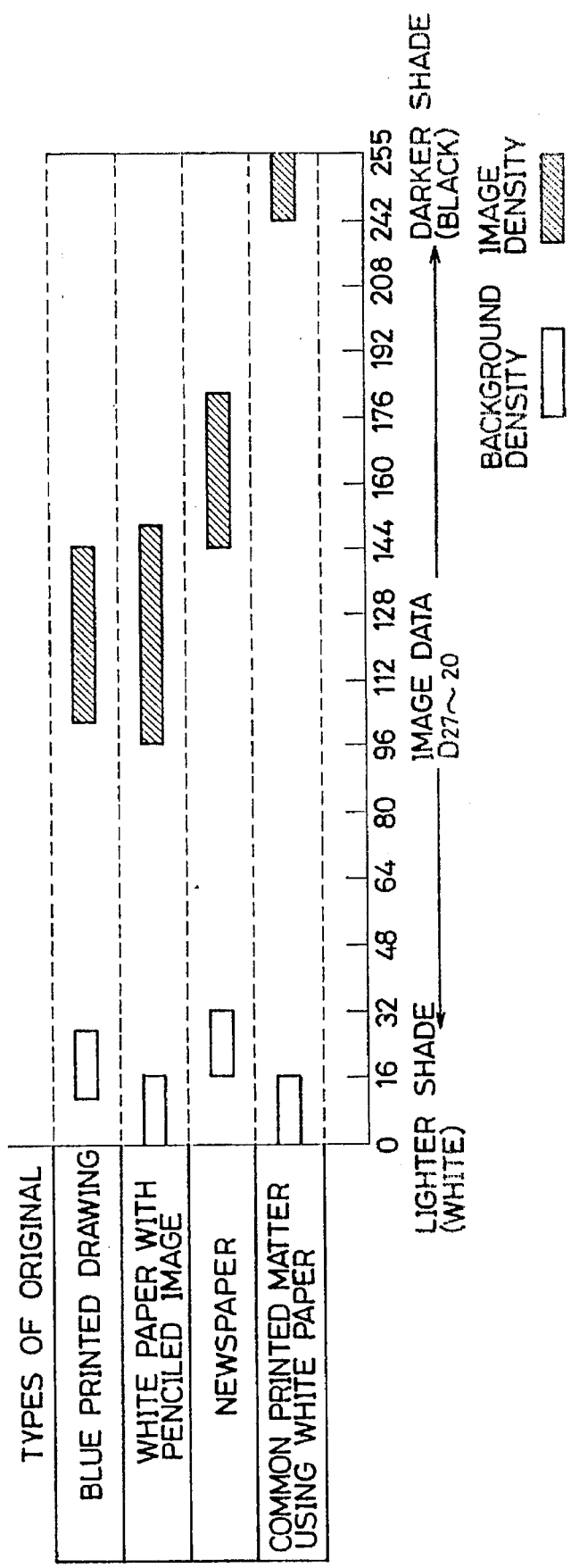

IMAGE PROCESSING DEVICE PROVIDING IMPROVED IMAGE DATA PROCESSING BY CONVERTING ORIGINAL IMAGE INTO A PLURALITY OF PIXELS AND ANALYZING DENSITY DATA OF EACH PIXEL

This application is a continuation of application Ser. No. 08/139,292, filed Dec. 15, 1992, now abandoned, which application is a continuation of application Ser. No. 07/486,860, filed Mar. 1, 1990, now abandoned.

BACKGROUND OF THE INVENTION

1. Field of the Invention

The present invention relates generally to image processing devices for outputting image signals to form images, and more particularly to automatic density correction for forming a distinct image.

2. Description of the Background Art

As means for reading images on digital copiers or facsimile devices, an image reading device has conventionally been employed which optically reads an original including a still image by an image sensor and then provides various image processings for read image data to output an image signal. The image signal outputted is utilized for image formation as a hard copy onto paper, or onto a liquid crystal display or CRT.

In such an image reading device, density correction for correcting image data to an optimal value is carried out in accordance with a shade of an image formed of characters or figures on the original, in order to form a distinct image. For example, even with a lighter shade image as drawn by pencils, image data is corrected so that an image formed as a hard copy, for example, has a suitable darkness.

Conventionally, density correction has been carried out by varying a reference voltage for analog/digital (A/D) conversion at the stage of A/D converting a read signal from an image sensor to generate image data of predetermined bits.

The amount of density correction is designated by operators, or alternatively, automatically adjusted. In the automatic density correction, the density of an image is detected in advance such as by preliminary scanning.

In a conventional reading device, when an original is a blue printed drawing or newspaper, where an image is formed on its colored background (except for white), the density of the background is corrected as well as that of the image formed thereon.

Thus, the conventional image reading device has presented such disadvantages as follows. In case of reading a lighter shade image formed on a non-white background to form an image, performing density correction so as to form a dark image results in formation of an indistinct image, which is an image as if it is formed on the stained background. On the other hand, when the density is corrected so that the background is not colored, the image itself is formed with a lighter shade and thus with a soft contrast.

In addition, since the conventional density correction entails analog control, not only accuracy in correction is unstable, but also characteristics of image processing such as tone reproduction and edge emphasis are liable to be deteriorated by a varied dynamic range of A/D conversion due to the density correction.

SUMMARY OF THE INVENTION

It is an object of the present invention to obtain distinct image data in an image processing device.

It is another object of the present invention to obtain distinct image data in an image processing device independently of the density of a background of an original.

It is a further object of the present invention to obtain image data with a sharper contrast independently of the density of a background of an original, in an image processing device.

In order to achieve the above objects, an image processing device in accordance with the present invention processes image data obtained by reading an original image including an image portion and a background portion, which original image is subdivided into a plurality of images. The image data includes density data indicating the density of each of pixels. The image processing device includes means for outputting background density data, means for outputting density coefficient data, background color removing means for decreasing a value of density data corresponding to the background portion based on the background density data, and density correction means for increasing a value of density data corresponding to the image portion based on the density coefficient data.

Since the image processing device constructed as above controls density data of the original image based on the background density data and density coefficient data, it is possible to obtain distinct image data independently of the background density of the original.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a graph showing density ranges of backgrounds and images of various kinds of originals.

DESCRIPTION OF THE PREFERRED EMBODIMENTS

The embodiments of the present invention will now be described with reference to the figures.

Figure 4:
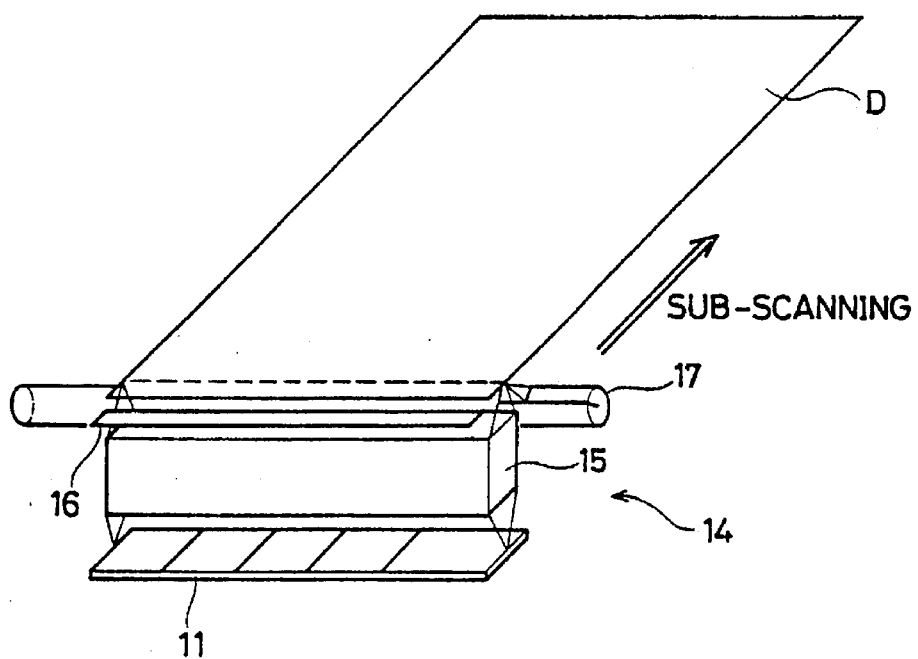
FIG. 4 is a perspective view of an optical system of an image reader incorporated in a digital copier according to the first embodiment of the present invention.
Figure 5:
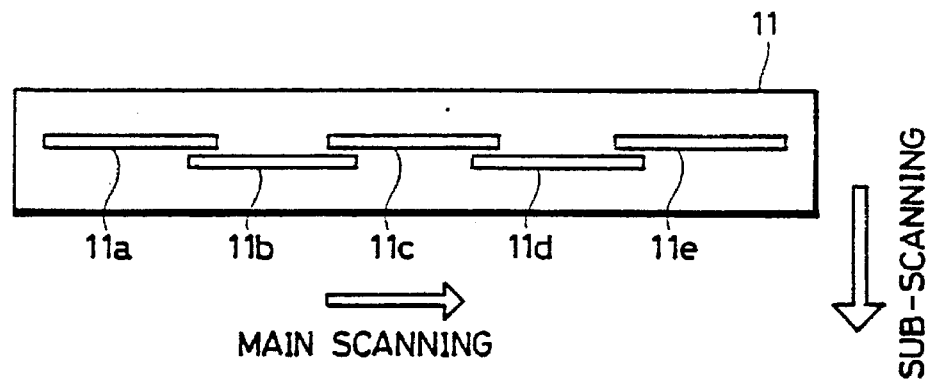
FIG. 5 is a plan view of an image sensor according to the first embodiment of the present invention.

FIG. 4 is a perspective view showing an optical system of an image reader IR incorporated in a digital copier; FIG. 5 is a plan view of an image sensor 11; and FIG. 6 is an enlarged view of CCD sensor chips 11a and 11b of FIG. 5.

An original D placed on a platen glass (not shown) is scanned by a slider 14 comprising the image sensor 11 shifting in a sub-scanning direction and is then read to be subdivided into pixels by an equal-scale magnification type optical system having an exposure lamp 17 such as a halogen lamp emitting light on a visible light band, a rod lens array 15 and the image sensor 11.

As shown in FIG. 5, the image sensor 11 comprises five CCD sensor chips 11a–11e arranged in a zigzag manner, successively laterally (a main scanning direction) and alternately longitudinally (the sub-scanning direction) spaced four pixels apart from one another. Due to a predetermined spacing in the sub-scanning direction, there occurs delay for output signals from the rear CCD sensor chips 11a, 11c and 11e in the sub-scanning direction. This delay is corrected by setting timing of a line shift pulse signal to be applied to each of the CCD sensor chips 11a–11e.

Figure 6:
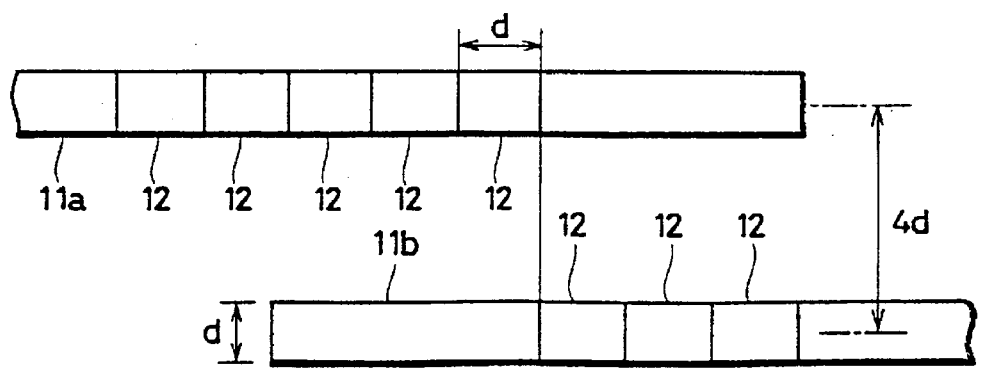
FIG. 6 is an enlarged view of CCD sensor chips of FIG. 5.

In each of the CCD sensor chips 11a–11e, a large number of elements 12, 12 . . . are arranged in a row, one with the size of about 63.5 μm (d=1/400 in.) square, as shown in FIG. 6 showing enlarged end portions of the chips. One element 12 corresponds to one pixel.

Figure 7:
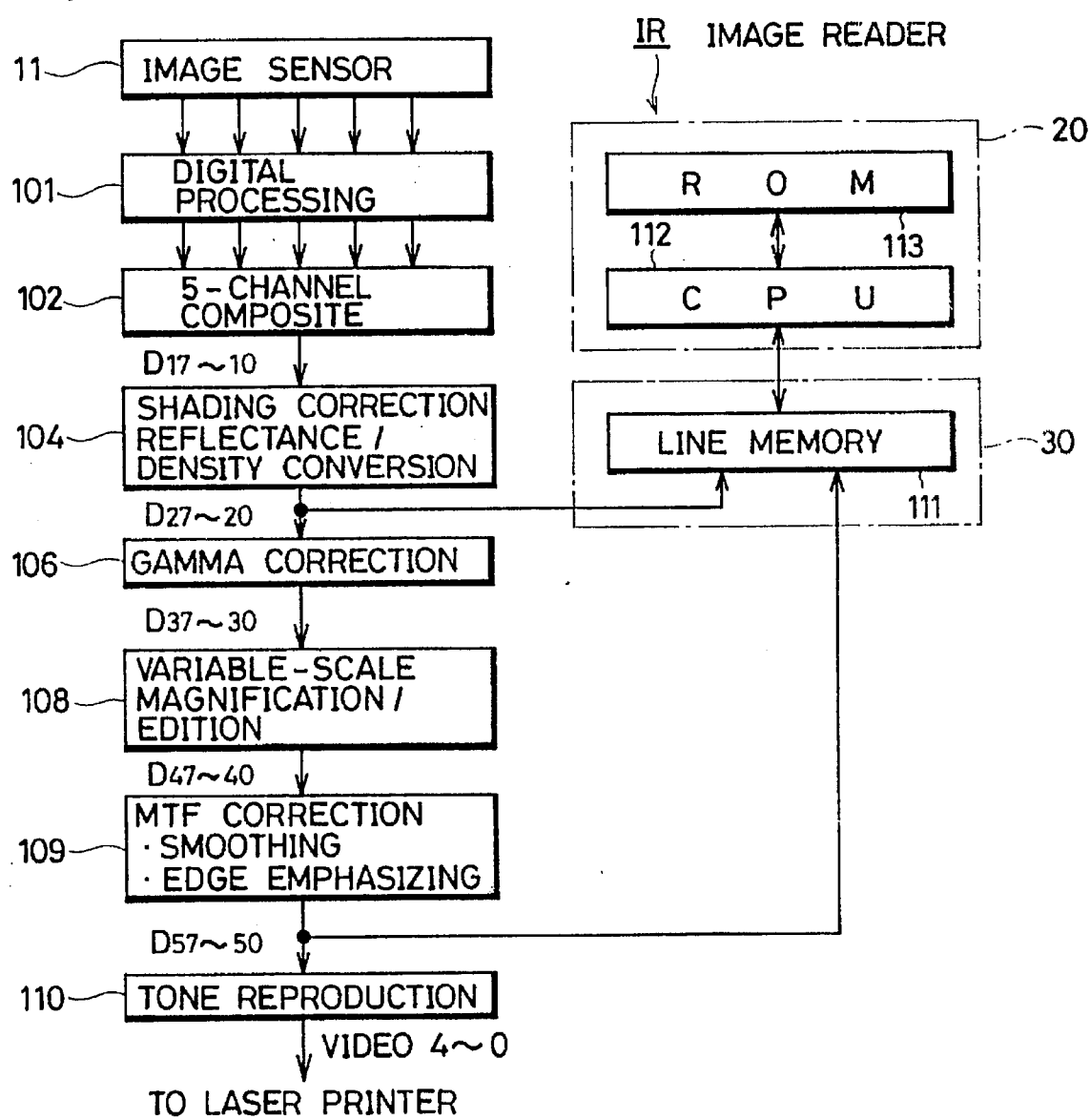
FIG. 7 is a block diagram of the image reader according to the first embodiment of the present invention.

FIG. 7 is a block diagram of an image reader IR.

In the image sensor 11, in order to accelerate reading speed in the main scanning direction, all five CCD sensor chips 11a–11e are driven simultaneously, so that each of those chips 11a–11e outputs a serial signal corresponding to 960 valid reading pixels.

Five serial outputs outputted simultaneously (in parallel) from those five CCD sensor chips 11a–11e undergo signal processing in the following image processing circuits 101–110 constituting an image processing portion together with a line memory 111, a CPU (Central Processing Unit) 112 and an ROM 113.

Those five photoelectric conversion outputs are first digitized by a digital processing circuit 101 comprising a sample and hold circuit and an A/D converter and are thus converted into image data of 8 bits (256 gradations) to be inputted to a 5-channel composite circuit 102.

Since the photoelectric conversion outputs are proportional to the intensity of reflected light from the original D, a value of image data at this time is "255" for pixels in a lightest shade white portion of the original D and "0" for pixels in a darkest shade black portion.

The 5-channel composite circuit 102 once stores image data two by two lines into five first-in first-out (FIFO) memories in total for every chip, sequentially selects image data from each chip in one line period to read the selected image data and thus outputs image data D 17-10 as a serial image signal corresponding to an arrangement of the pixels (the order of read scanning).

Next, image data D17-10 inputted to a shading correction circuit 104 are subject to corrections for light intensity distribution (unevenness in quantity of light) in the main scanning direction of the exposure lamp 17 and for a difference in sensitivity between any elements 12, based on reference image data by one line which read a reference white plate 16 (see FIG. 4).

In addition, in this shading correction circuit 104, the image data D17-10 being a data signal proportional to the intensity of reflected light is converted logarithmically with regard to viewing characteristics in consideration for a reading range of the original D, and is then converted into image data D27-20 as a density data signal proportional to the density of each pixel. That is, the value of image data D27-20 becomes larger as each pixel becomes darker shade, so that the value is "0" for the pixels in the lightest shade white portion of the original D and "255" for the pixels in the darkest shade black portion.

The image data D27-20 undergo density correction processing, which will be described later, for forming a distinct image, in a gamma correction circuit 106. The gamma correction circuit 106 outputs image data D37-30 as correction image data.

A variable-scale magnification/edition circuit 108 carries out altering the timing of and the order of outputting image data D47-40 to be outputted, or changing scanning speed in the sub-scanning direction, in order to form by a thinning-out method or an interpolation method a variable-scale magnified image which is enlarged or contracted, and an image edited by shifting, mirror inversion and the like.

An MTF correction circuit 109 carries out smoothing to prevent occurrence of moire fringe and edge emphasizing to eliminate an edge loss.

Image data D57-50 outputted from the MTF correction circuit 109 undergo binarization by an area gradation method in a tone reproduction circuit 110 and then transmitted as image signal VIDEO4-0 to a laser printer (not shown) forming a copied image on paper by electrophotographic process.

The line memory 111 is used for temporarily storing image data at a specific processing stage. The ROM 113 reads out programs and numerous data.

Figure 1:
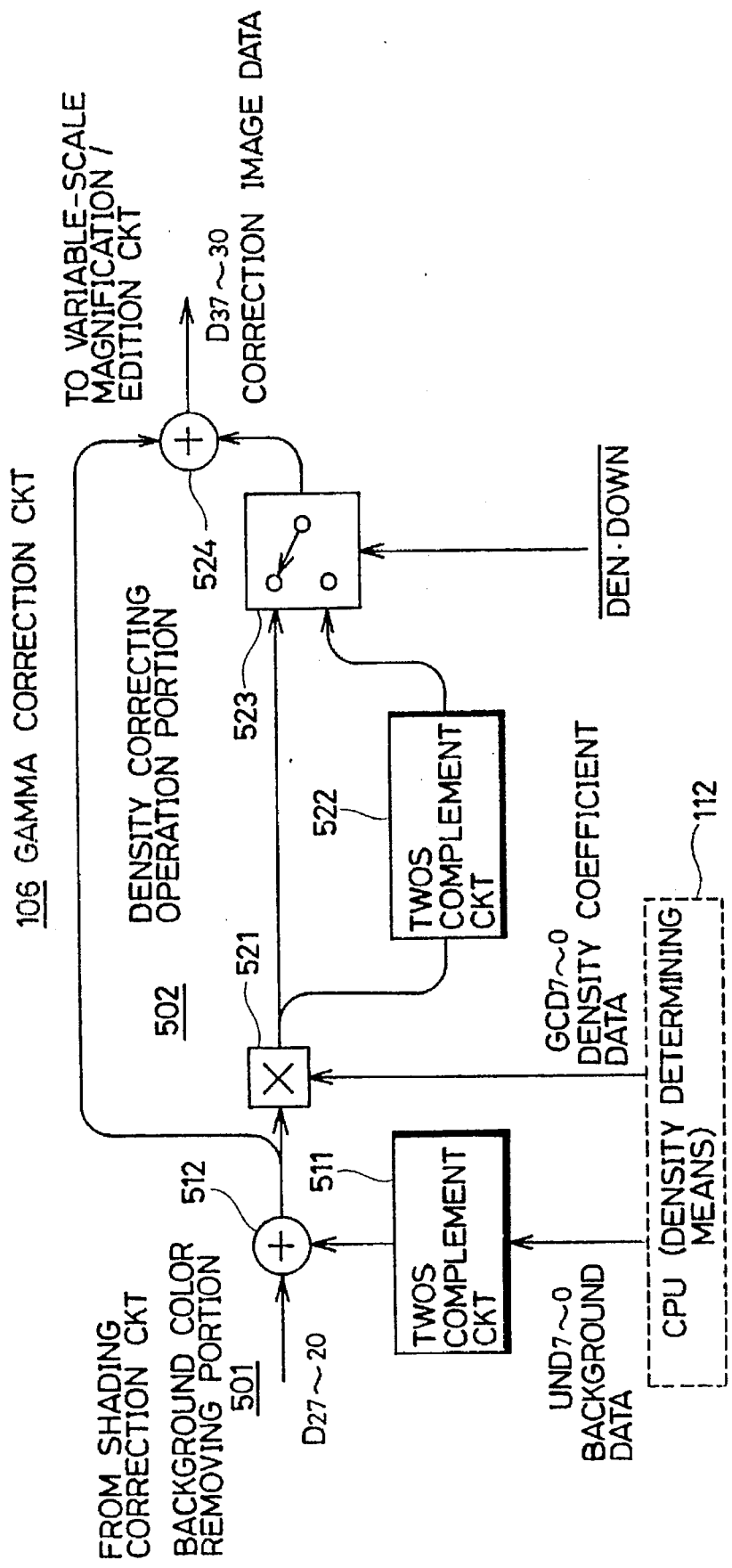
FIG. 1 is a block diagram of a gamma correction circuit according to a first embodiment of the present invention.
Figure 2:
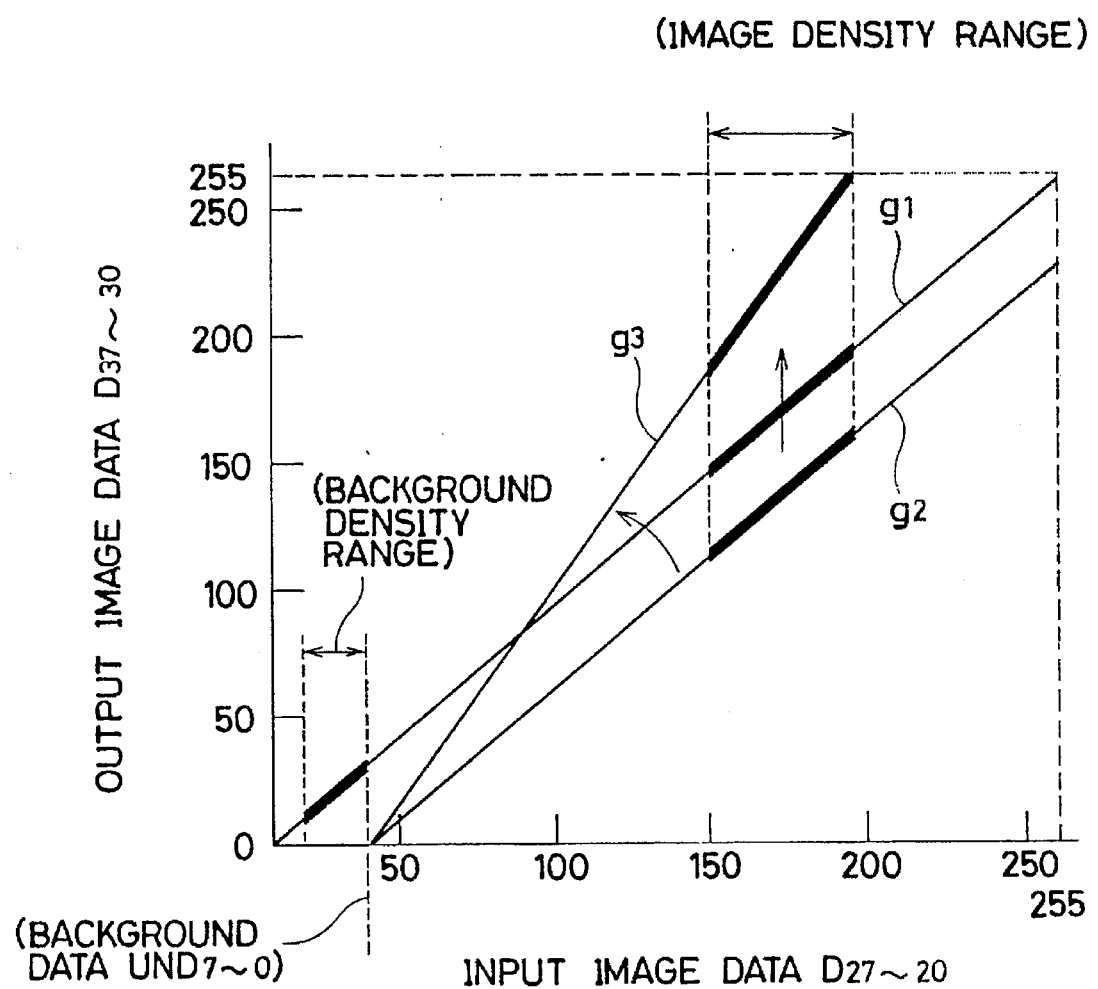
FIG. 2 is a graph showing a relationship between input and output of the gamma correction circuit of FIG. 1.

FIG. 1 is a block diagram of the gamma correction circuit 106 according to the first embodiment; FIG. 2 is a graph showing the relationship between input and output of the gamma correction circuit 106; and FIG. 13 is a graph showing densities of backgrounds and images of various kinds of originals.

As shown in FIG. 1, the gamma correction circuit 106 carries out background color removal processing in a background color removing portion 501 and density correcting operation in a density correcting operation portion 502 for the image data D27-20 outputted from the shading correction circuit 104.

Referring to FIG. 2, the line "g1" indicates the relationship between input and output in case where density correction is not provided, that is, where the processing of the gamma correction circuit 106 is not performed; the line "g2" indicates the relationship in case where only the background color removal processing is provided; and the line "g3" indicates that in case where the further density correcting operation is provided.

FIG. 13 shows a common distribution state of image data D27-20 reading four kinds of originals: a blue printed drawing, an original that an image is penciled on white paper, newspaper and a common printed matter using white paper. A blank box area in the figure represents a density range of a background of each original (background density range), while a hatched box area represents a density range of an image (image density range). In case of the common printed matter, for example, the background density range has a value within "0"–"16" near the minimum level, and the image density range has a value within "242"–"255" near the maximum level. In this case, there is a large difference between the background density and the image density. It makes it possible to form a distinct image without the density correction processing.

Meanwhile, in the case of newspaper, the background density range has a value within "16"–"32", which is larger than that in the case of the common printed matter, and the image density range has a value within "144"–"180", which is smaller than that in the case of the printed matter. That is, newspaper has a darker shade background color and also a lighter shade image than those of the common printed matter, and thus gives a soft contrast to the background and image. Therefore, if a distinct copied image is intended to be formed onto such an original as newspaper, such density correction processing is required as to increase a difference between a value for the background and that for the image.

As shown in FIG. 1, the gamma correction circuit 106 comprises the density correcting operation portion 502 for increasing or decreasing the value of image data based on density coefficient data GCD7-0, and the background color removing portion 501 for decreasing the value of image data based on background data UND7-0.

The density coefficient data GCD7-0 and background data UND7-0 are, in density determination processing carried out by a CPU 112, which will be described later, evaluated depending on a background density and a maximum density within a predetermined area of the original D, detected by a preliminary scanning which is carried out before a scanning (main scanning) for outputting image signals VIDEO4-0 corresponding to the original D. The density coefficient data GCD7-0 are handled as a positive decimal in which the most significant bit out of 8 bits is allotted to unit's place and lower 7 bits to seven decimal places.

Image data D27-20 inputted from the shading correction circuit 104 first undergo the background color removal processing at the background color removing portion 501.

In an example of FIG. 2, for example, there is shown the processing state in case where the background data UND7-0 is "30". Under the background color removal processing, the image data D27-20 inputted is decreased by "30", the value of the background data UND7-0, and the line "g2" of FIG. 2 is shifted right in parallel by "30" toward the line "g1".

In FIG. 1, the background data UND7-0 is converted into negative number data by a twos complement circuit 511 in the background color removing portion 501 to be supplied to an adder 512. The adder 512 adds positive image data D27-20 and negative background data UND7-0.

The density correcting operation portion 502 carries out increasing or decreasing data by an operation which is the combination of multiplication and addition in order to achieve a wide-range multi-level correction by processing of a limited number of bits (8 bits the same number as for image data).

That is, the density operation portion 502 comprises a multiplier 521 for multiplying image data D27-20 inputted through the background color removing portion 501 and density coefficient data GCD7-0 together, a twos complement circuit 522 for converting an output of the multiplier 521 into negative number data, a shade selector 523 for selecting the output of the multiplier 521 or that of the twos complement circuit 522 in response to a shade control enable signal $\overline{DEN \cdot DOWN}$, and an adder 524 for adding the inputted image data D27-20 and a selective output of the shade selector 523. The density operating portion 502 carries out an operation of correcting the inputted image data D27-20 in the range of 0–3 times.

When a darker shade image is formed, the enable signal $\overline{DEN \cdot DOWN}$ attains a logic high level, and at this time, the shade selector 523 selects the output of the multiplier 521. When a lighter shade copied image is designated to be formed by an operator, the enable signal $\overline{DEN \cdot DOWN}$ attains a logic low level, and at this time, the shade selector 523 selects the output of the twos complement circuit 522.

Accordingly, where output data from the adder 512 is denoted with Di, the density coefficient data GCD7-0 is γ, and output image data D67-60 is Do, the adder 524 carries out adding operation given by Do=Di±γDi. Altering the density coefficient data GCD7-0 (γ) makes it possible to carry out density correction with virtually no level.

As apparent from a comparison between the lines "g3" and "g1" of FIG. 2, when the input image data D27-20 is smaller than the background data UND7-0, output image data D37-30 is "0". Meanwhile, when the input image data D27-20 exceeds the background data UND7-0, the output image data D37-30 increases in an inclination larger than 1. Thus, a density difference between the background and image is increased.

Description will now be given of an operation of the CPU 112 for evaluating density coefficient data GCD7-0 and background data UND7-0 to be supplied to the γ correction circuit 106.

Figure 3:
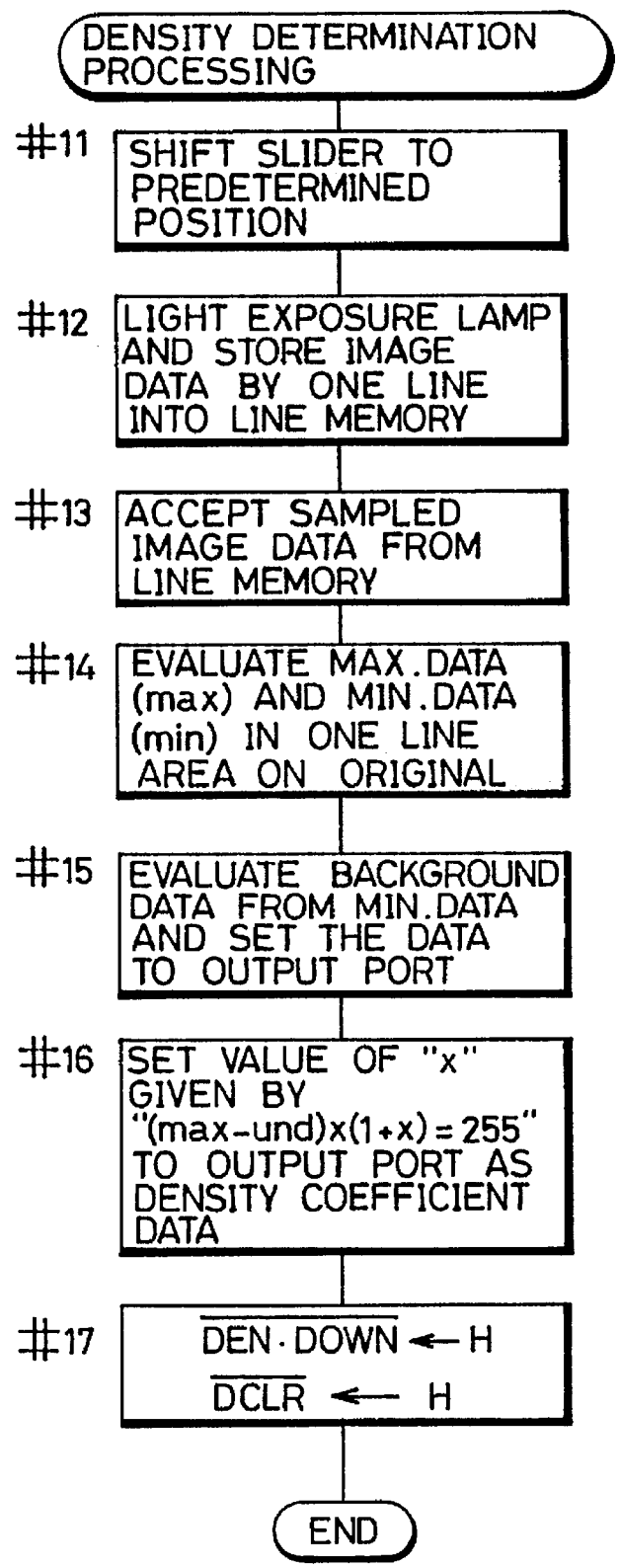
FIG. 3 is a flow chart of density determining processing according to the first embodiment of the present invention.
Figure 8:
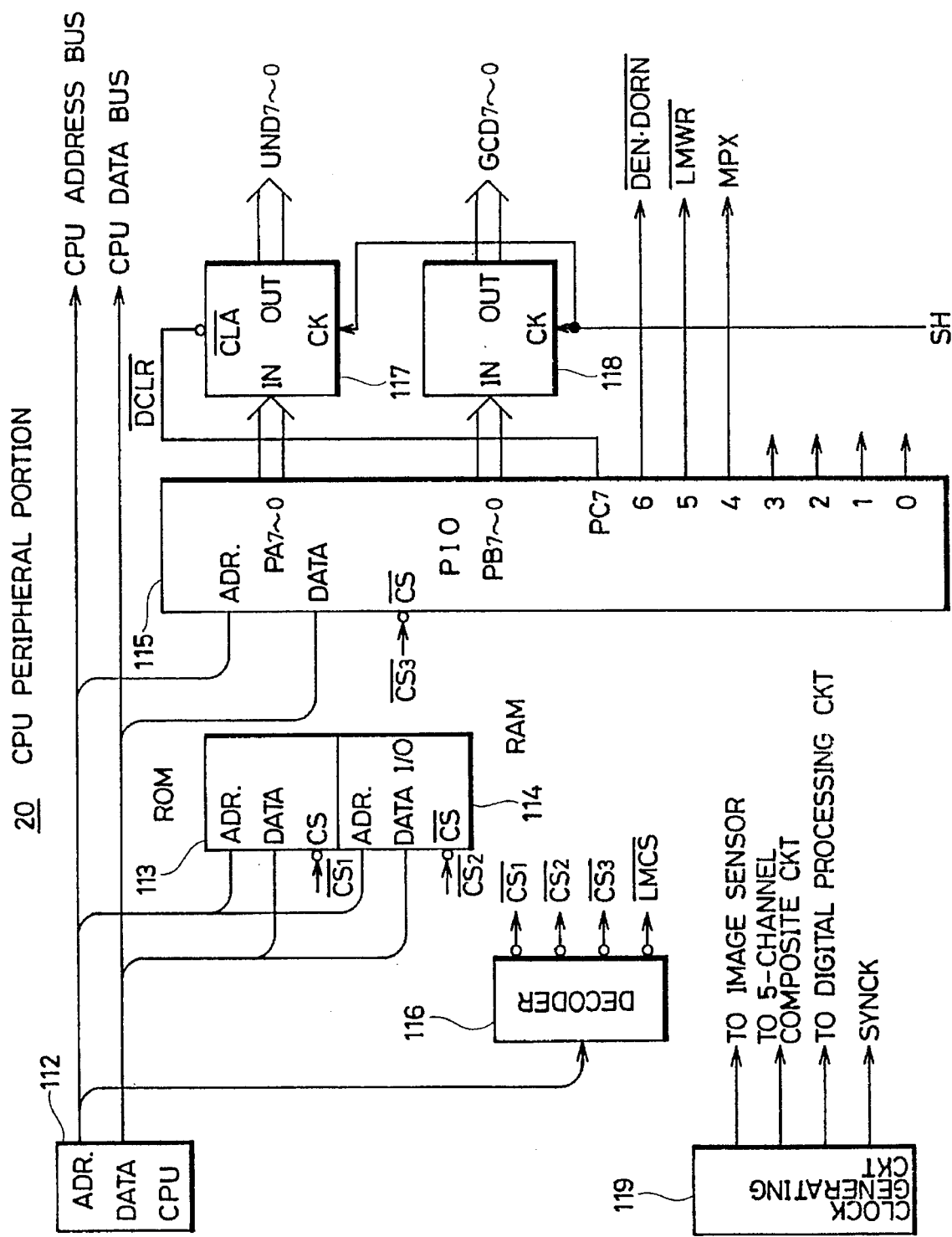
FIG. 8 is a block diagram of peripheries of a CPU according to the first embodiment of the present invention.
Figure 9:
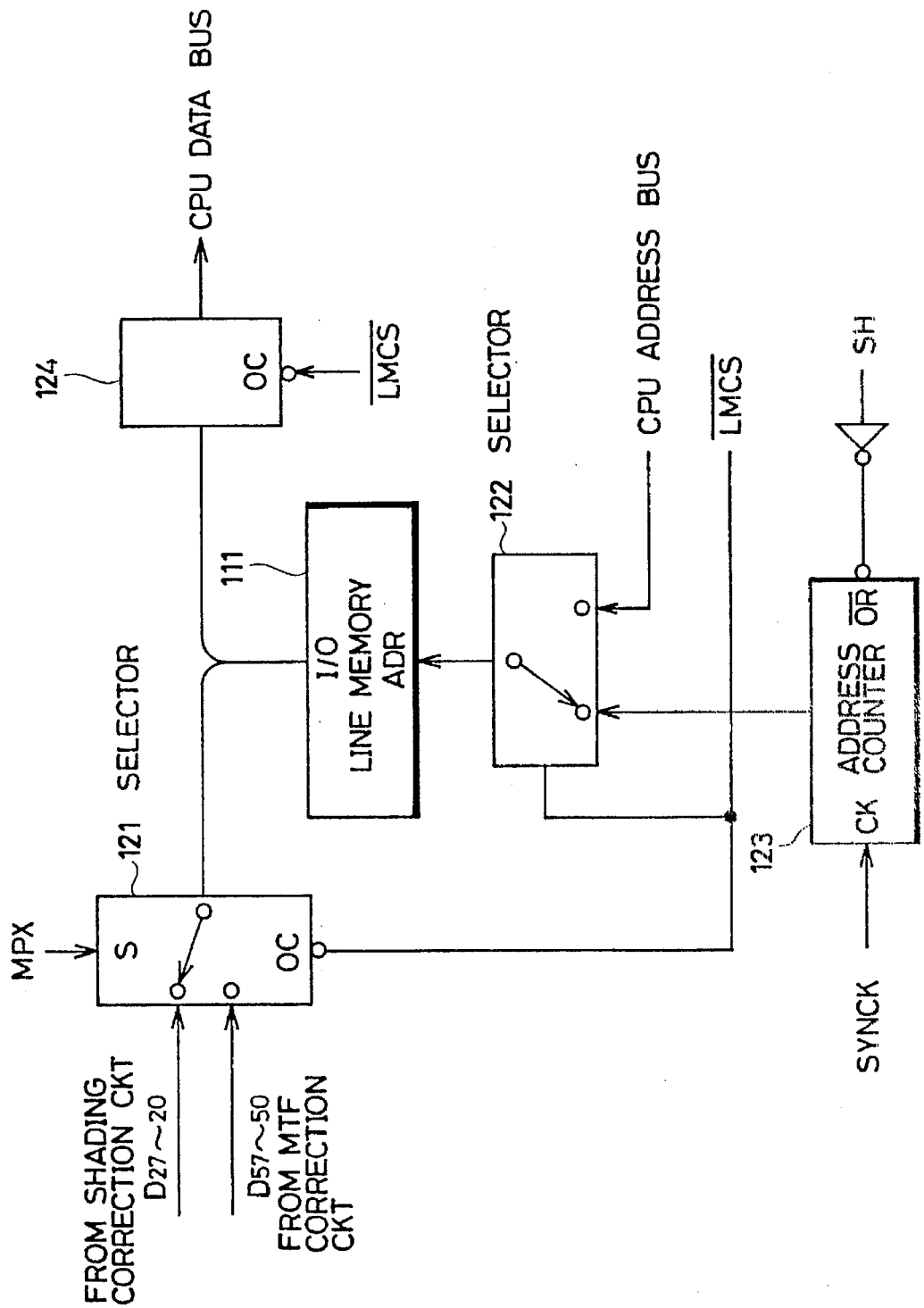
FIG. 9 is a block diagram of peripheries of a line memory according to the first embodiment of the present invention.

FIG. 3 is a flow chart of density determining processing; FIG. 8 is a block diagram of a CPU peripheral portion 20; and FIG. 9 is a block diagram of a line memory peripheral portion 30.

Referring to FIG. 8, the CPU 112 is connected through a CPU address bus and a CPU data bus to the above described ROM 113, an RAM 114 for temporarily storing an operational parameter or the like, and to an interface 115 having parallel input/output ports.

A decoder 116 decodes an address from the CPU 112 to output chip select signals $\overline{CS1}$–$\overline{CS3}$ for accessing the ROM 113, the RAM 114 and the interface 115, respectively, and a signal $\overline{LMCS}$ for controlling connection between the line memory 111 and the CPU data bus. Output ports PA7-0, PB7-0 of the interface 115 are connected to the γ correction circuit 106 through latch circuits 117 and 118, respectively, to output background data UND7-0 and density coefficient data GCD7-0.

The output port PC7 outputs a data clear signal $\overline{DCLR}$. When the signal $\overline{DCLR}$ is at a logic low level, the latch circuit 117 outputs data of "0" as background data UND7-0.

In the CPU peripheral portion 20, a clock generating circuit 119 is provided which generates various kinds of clock signals for controlling each portion, such as a clock signal SYNCK to be a reference in transmitting image data for each pixel between any image processing circuits 101–110.

Referring to FIG. 9, a line memory peripheral portion 30 comprises a line memory 111, a selector 122 for selecting image data stored in this line memory 111, an address counter 123 which increments in synchronization with a clock signal SYNCK, a selector 122 for selecting address from the address counter 123 or that from the CPU 112 to address the line memory 111, a bus gate circuit 124 which is controlled responsive to the above described signal $\overline{LMCS}$ and so on.

Referring to FIG. 3, the CPU 112 executes preliminary scanning before scanning (main scanning) for outputting image signals VIDEO4-0 in order to detect in advance a shade of the original D, i.e., density of an image and that of background. That is, in the step #11, the slider 14 is moved to a predetermined position, for example, near the center of the original D.

Next, in the step #12, the exposure lamp 17 is lit, so that image data D27-20 by one line outputted from the shading correction circuit 104 is stored in the line memory 111. That is, a write signal $\overline{\text{LMWR}}$ and a switching signal MPX which are outputted respectively from output ports PC5 and PC4 of the interface 115 both attain the logic low level. The selector 122 selects address from the address counter 123, while the selector 121 selects image data D27-20 as an input.

In the step #13, the CPU 112 makes the write signal $\overline{\text{LMWR}}$ and the signal $\overline{\text{LMCS}}$ attain the logic high level, accesses the line memory 111 so as to sample image data for every 16 pixels out of image data by one line through the CPU address bus, and accepts image data into the CPU 112 from the line memory 111 through the CPU data bus. This makes it possible to carry out sampling in an about 1 mm interval for one line area on the original D along the main scanning direction.

In the step #14, sampled image data D27-20 by about 300 pixels are divided into sixteen blocks to select for every block individual maximal data having a maximum value and individual minimal data having a minimum value out of image data D27-20 within the blocks. Thereafter, an average value (max) of the selected sixteen individual maximal data is evaluated, so that the evaluated average value (max) is made maximal data within one line area on the original D. Also, an average value (min) of the selected sixteen individual minimal data is evaluated, so that the evaluated average value (min) is made minimal data within one line area on the original D. The maximal data corresponds to the density of the highest density portion of the original D.

Next, in the step #15, a predetermined value "α" is added to the minimal data evaluated in the step #14 to evaluate "und=min+α", so that the evaluated value "und" is set as background data UND7-0 corresponding to the density of the background of the original D to the output ports PA7-0 of the interface 115. The value "α" here is a correction constant evaluated by an experiment to cope with the fluctuation of individual minimal data due to density irregularity of the background or the like.

In the step #16, a value "x" which satisfies the following expression (1) to be density coefficient data GCD7-0 is evaluated, so that the evaluated value "x" is set to the output ports PB7-0 of the interface 115.

$$(max\text{-}und) \times (1+x)=255 \qquad (1)$$

In the last step #17, the above described enable signal $\overline{\text{DEN·DOWN}}$ and an enable signal $\overline{\text{DCLR}}$ are set at the logic high level to complete the processings.

When the main scanning starts, the γ correction circuit 106 carries out the background color removal processing and density correcting operation as described above, and the image reader IR outputs image signals VIDEO4-0 for forming a distinct copied image with a lighter shade (white) background and a darker shade (black) image.

Figure 10:
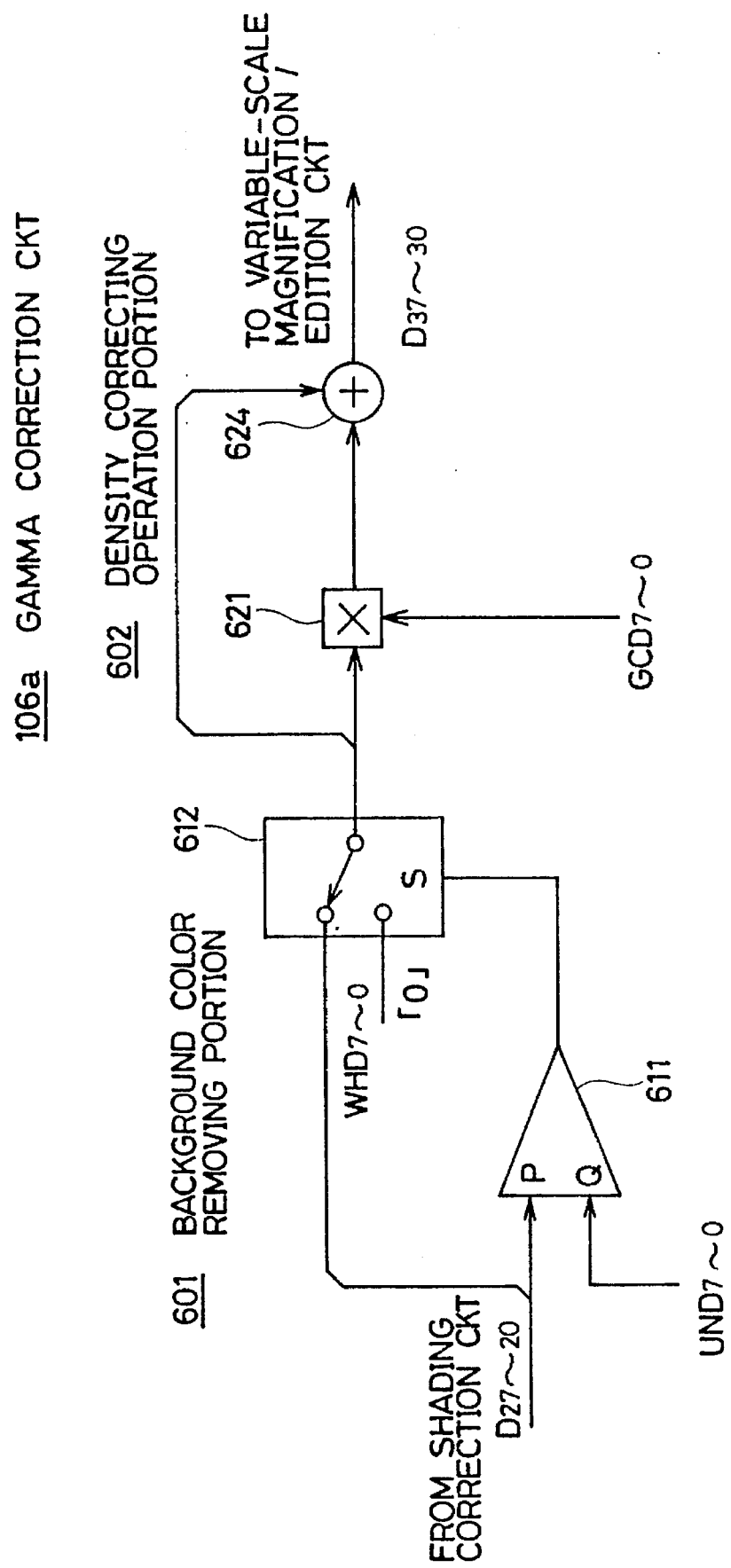
FIG. 10 is a block diagram of a gamma correction circuit according to a second embodiment of the present invention.
Figure 11:
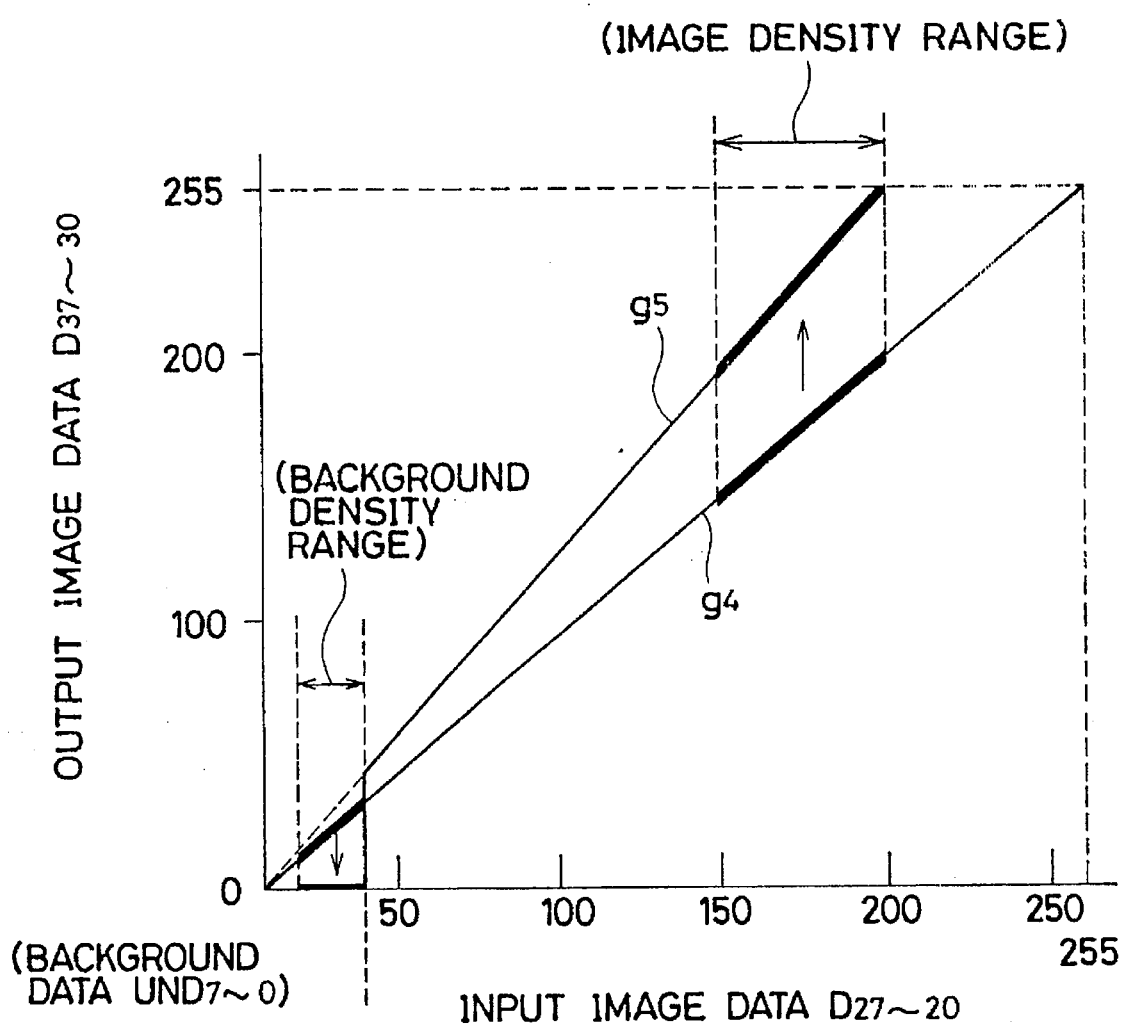
FIG. 11 is a graph showing a relationship between input and output of the gamma correction circuit of FIG. 10.

FIG. 10 is a block diagram of a γ correction circuit 106a according to the second embodiment, and FIG. 11 is a graph showing a relationship between input and output of the γ correction circuit 106a.

Referring to FIG. 10, the γ correction circuit 106a comprises a background color removal portion 601 for decreasing a value of image data based on background data UND7-0, and a density correcting operation portion 602 for increasing a value of image data based on density coefficient data GCD7-0.

The background color removal portion 601 comprises a comparator 611 for comparing image data D27-20 inputted from the shading correction circuit 104 with the background data UND7-0, and a selector 612 for selecting image data D27-20 or white data WHD7-0 always having a value of "0" in accordance with an output of the comparator 611 to output the selected data. The density correcting operation portion 602 comprises a multiplier 621 for multiplying image data D27-20 inputted through the background color removal portion 601 and density coefficient data GCD7-0 together, and an adder 624 for adding an output of the multiplier 621 and image data D27-20 to be inputted together. The density correcting operation portion 602 carries out an operation of increasing the inputted image data D27-20 in the range of one to three times.

The image data D27-20 inputted from the shading correction circuit 104 first undergoes background color removal processing in the background color removal portion 601.

When the image data D27-20 inputted from the shading correction circuit 104 is larger than the background data UND7-0, the output of the comparator 611 attains the logic low level, so that the selector 612 selects image data D27-20 as an output. Conversely, when the image data D27-20 is smaller than the background data UND7-0, the output of the comparator 611 attains the logic high level, so that the selector 612 selects white data WHD7-0 as an output.

The image data D27-20 outputted from the selector 612 is then subject to density correcting operation processing in the density correcting operation portion 602.

The density correcting operation portion 602, similarly to the density correcting operation portion 502 of the first embodiment, increases data by an operation which is a combination of multiplication and addition in order to achieve a correction in a broader range by the processing with a limited number of bits. That is, assuming that output data of the selector 612, density coefficient data GCD7-0 and output image data D37-30 are represented by Di, γ and Do, respectively, the adder 624 carries out an adding operation given by Do=Di+γDi.

The line "g4" of FIG. 11 represents a characteristic of input/output of the γ correction circuit 106a when the background data UND7-0 and density coefficient data GCD7-0 are both "0", i.e., when carrying out no substantial density correction, while the line "g5" represents a characteristic of input/output of the circuit 106a when a predetermined value of the background data UND7-0 and that of the density coefficient data GCD7-0 are provided to carry out a density correction comprising both the background color removal and density correcting operation. As apparently seen from the comparison between the line "g4" and the line "g5", the density correcting processing causes image data D27-20 corresponding to the background to be decreased to "0" and also causes image data D27-20 corresponding to the image to be increased, so that a density difference between the background and image is more increased than input image data D27-20 as for output image data D37-30.

Description will then given on an operation of the CPU 112 for evaluating background data UND7-0 and density coefficient data GCD7-0 to be supplied to the γ correction circuit 106a.

Figure 12:
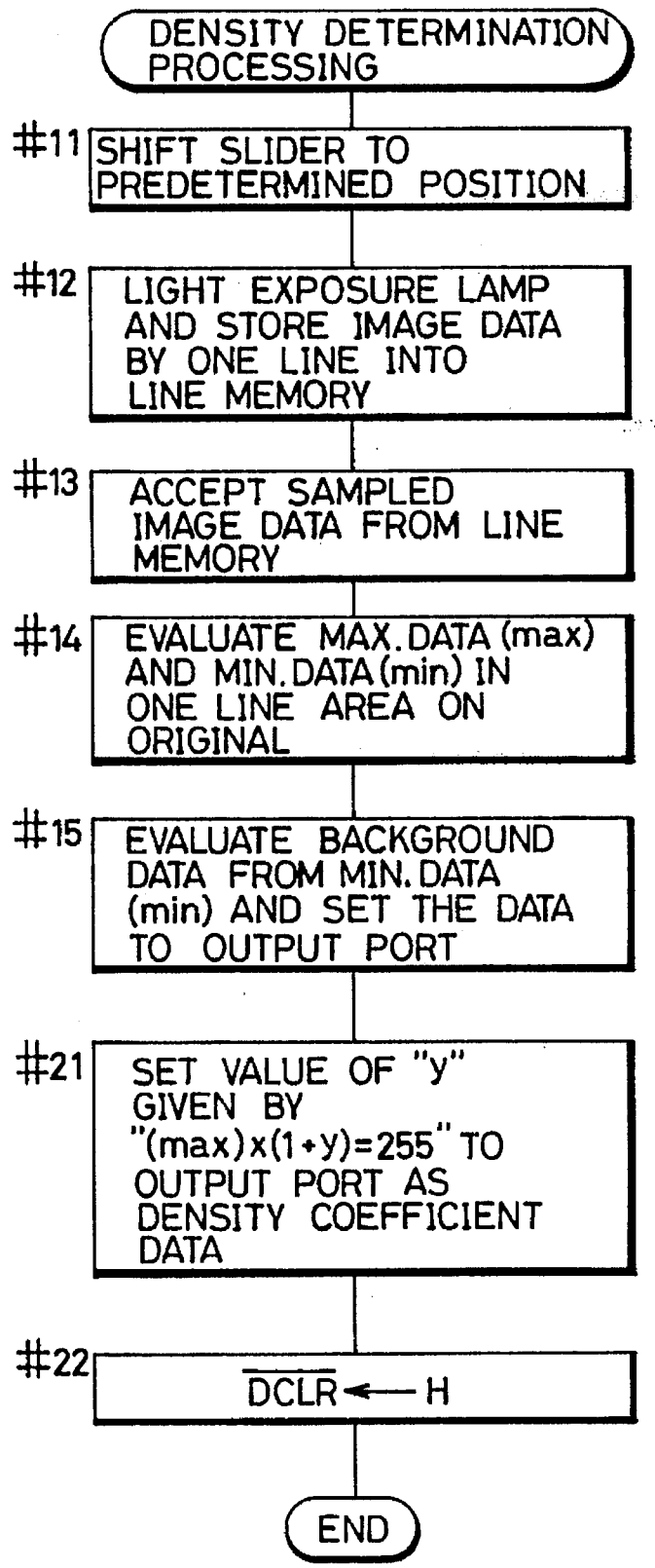
FIG. 12 is a flow chart of density determining processing according the second embodiment of the present invention.

FIG. 12 is a flowchart of density determination according to the second embodiment.

Since the steps #11–#15 in FIG. 12 denoted with the same reference numerals as in FIG. 3 indicate the same density determining processing according to the first embodiment of FIG. 3, a description of those steps will not be repeated.

In the step #21 subsequent to the step #15, a value "y" which satisfies the following expression (2) to be density coefficient data GCD7-0 is evaluated, so that the evaluated value "y" is set to the output ports PB7-0 of the interface 115.

$$(max) \times (1+y)=255 \qquad (2)$$

In the step #22, the enable signal $\overline{\text{DCLR}}$ is set at the logic high level to complete the processing.

When the main scanning is started, the γ correction circuit 106a carries out the background color removal processing and density correcting operation, as described above, based on the background data UND7-0 and density coefficient data GCD7-0 set to the output ports PA7-0, PB7-0. The image reader IR outputs image signals VIDEO4-0 enabling the formation of a distinct copied image with a lighter shade (white) background and a darker shade (black) image. In comparison with the second embodiment, the first embodiment is better on simplicity of the circuit construction and on reproducibility of a low density portion of the original image.

In the above described embodiment, although the slider 14 is stopped at a predetermined position to sample pixels within one line area on the original D and thus detect the density of the original D, in the preliminary scanning, it is possible to arbitrarily set an area on the original D for sampling in order to detect the density. That is, the background data UND7-0 and density coefficient data GCD7-0 may be evaluated from image data corresponding to pixels in a plurality of line areas or an overall area of the original D. Further, the background data UND7-0 and density coefficient data GCD7-0 may appropriately be set during the main scanning dependently on the density of each specific area on the original D. This setting makes it possible to obtain an overall distinct copied image with a density appropriately adjusted for each area, even if such an original D is employed that the density of the background or the image considerably varies within one sheet of the original D, for example, an original D in which a darker shade printed character image is formed in its first half area, and a lighter shade penciled character image is formed in the latter half area.

While the above described embodiments have been explained assuming that the preliminary scanning is carried out before the main scanning in order to detect the density of the original D, when preliminary scanning for detecting the size of the original D is carried out, the density of as well as the size of the original D may be detected during the preliminary scanning.

In addition, while the separate preliminary scanning is carried out before the main scanning to detect the density of the original D in the above described embodiments, the density of the original may be detected during the main scanning without performing the preliminary scanning for density detection so as to make image data after the density detection undergo density correction processing based on the detected density.

In accordance with the present invention, it is possible to form a distinct image with a good contrast independently of the density of the background.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing device for processing image data of an image including an image portion and a background portion which has no image thereon to subdivide the image into a plurality of pixels, said image data including density data representing density of each of said pixels, said image processing device comprising:

first detection means for detecting density of the background portion of the image;

second detection means for detecting density of the image portion of the image;

means for determining background density data based on the detected density of the background portion and determining density coefficient data based on the detected density of the image portion;

background color removal means for decreasing a value of said density data based on said background density data so that any color in the background portion is removed; and density correction means for amplifying a value of said density data decreased by said background color removal means based on said density coefficient data.

2. The image processing device in accordance with claim 1, wherein said background color removal means substantially converts into "0" a value of said density data having density equal to or lower than density corresponding to said background density data.

3. The image processing device in accordance with claim 1, wherein said first detection means includes minimal density detection means for detecting minimal density in each section into which the image is divided, and then calculating an average of minimal densities of the sections to obtain the density of the background portion.

4. The image processing device in accordance with claim 1, wherein said second detection means includes maximal density detection means for detecting maximal density in each section into which the image is divided, and then calculating an average of maximal densities of the sections to obtain the density of the image portion.

5. The image processing device in accordance with claim 1, wherein said first detection means includes minimal density detection means for detecting minimal density in each section into which the image is divided and then calculating an average of minimal densities of the sections to obtain the density of the background portion, and said second detection means includes maximal density detection means for detecting maximal density in each section into which the image is divided and then calculating an average of maximal densities of the sections to obtain the density of the image portion.

6. An image processing device for processing image data of an image including an image portion and a background portion which has no image thereon to subdivide the image into a plurality of pixels, said image data including density data representing density of each of said pixels by digital signal, said image processing device comprising:

minimal density detection means for detecting density of a minimal density portion of the image;

maximal density detection means for detecting density of a maximal density portion of the image;

determining means for determining background density data of said background portion based on the detected density of the minimal density portion and determining density coefficient data based on the detected density of the maximal density portion;

background color removal means for decreasing a value of said density data based on said background density data so that any color in the background portion is removed; and density correction means for amplifying a value of said density data decreased by said background color removal means based on said density coefficient data so that the value of the density data of the maximal density portion are converted into an uppermost level of the digital signal.

7. The image processing device in accordance with claim 6, wherein said minimal density detection means detects density of minimal density portion in each section into which the image is divided, and said maximal density detection means detects density of maximal density portion in each section into which the image is divided, and said determining means calculates averages of the minimal densities and maximal densities of the sections to obtain the background density data and density coefficient data.

8. A method of processing density data of an image including an image portion and a background portion which has no image thereon to subdivide the image into a plurality of pixels, said image data including density data representing density of each of said pixels by digital signal, said method comprising the steps of:

detecting density of the background portion of the image;

detecting density of the image portion of image;

evaluating background density data based on the detected density of the background portion;

evaluating density coefficient data based on the detected density of the image portion;

decreasing a value of said density data based on said background density data so that any color in the background portion is removed; and amplifying a value of said decreased density data based on said density coefficient data.

9. A method of processing image data of an image including an image portion and a background portion which has no image thereon to subdivide the image into a plurality of pixels, said image data including density data representing density of each of said pixels by digital signal, said method comprising the steps of:

first scanning the image by an image sensor to detect density of the background portion and density of the image portion;

evaluating background density data based on the density of the background portion;

evaluating density coefficient data based on the density of the image portion, wherein said density coefficient data is used to amplify the value of the maximal density portion to the uppermost level of the digital signal;

second scanning the image for reading the image;

decreasing a value of said density data obtained by said second image scanning based on said background density data so that any color in the background portion is removed; and amplifying a value of said decreased density data based on said density coefficient data.

* * * * *